(12) United States Patent
Huang

(10) Patent No.: US 12,510,884 B2
(45) Date of Patent: Dec. 30, 2025

(54) MACHINE LEARNING DEVICE, ADDITIVE MANUFACTURING SYSTEM, MACHINE LEARNING METHOD FOR WELDING CONDITION, METHOD FOR ADJUSTING WELDING CONDITION, AND A NON-TRANSITORY COMPUTER READABLE MEDIUM STORING A PROGRAM

(71) Applicant: KABUSHIKI KAISHA KOBE SEIKO SHO (KOBE STEEL, LTD.), Hyogo (JP)

(72) Inventor: Shuo Huang, Hyogo (JP)

(73) Assignee: KABUSHIKI KAISHA KOBE SEIKO SHO (KOBE STEEL, LTD.), Hyogo (JP)

(*) Notice: Subject to any disclaimer, the term of this patent is extended or adjusted under 35 U.S.C. 154(b) by 462 days.

(21) Appl. No.: 18/005,574

(22) PCT Filed: Jun. 16, 2021

(86) PCT No.: PCT/JP2021/022941
§ 371 (c)(1),
(2) Date: Jan. 13, 2023

(87) PCT Pub. No.: WO2022/014240
PCT Pub. Date: Jan. 20, 2022

(65) Prior Publication Data
US 2023/0273605 A1 Aug. 31, 2023

(30) Foreign Application Priority Data
Jul. 15, 2020 (JP) .................................. 2020-121581

(51) Int. Cl.
*G05B 19/418* (2006.01)

(52) U.S. Cl.
CPC ................. *G05B 19/41865* (2013.01); *G05B 2219/45135* (2013.01)

(58) Field of Classification Search
CPC .... G05B 19/41865; G05B 2219/45135; B23K 9/0953; B23K 9/173; B23K 31/006;
(Continued)

(56) References Cited

U.S. PATENT DOCUMENTS

| 2013/0098971 A1* | 4/2013 | Ohdake .................... B23K 9/32 228/7 |
| 2017/0028499 A1 | 2/2017 | Yoshida et al. |

(Continued)

FOREIGN PATENT DOCUMENTS

| CN | 110883403 A | 3/2020 |
| JP | 2017-030014 A | 2/2017 |
| JP | 2020-069662 A | 5/2020 |

OTHER PUBLICATIONS

Rodriguez-Gonzalvez, P. and Rodri-guez-Marti-n, M., 2019. Weld bead detection based on 3D geometric features and machine learning approaches. IEEE Access, 7, pp. 14714-14727. (Year: 2019).*
(Continued)

*Primary Examiner* — Alicia M. Choi
(74) *Attorney, Agent, or Firm* — Studebaker Brackett PLLC

(57) ABSTRACT

A machine learning device that performs machine learning of a welding condition for manufacturing an additively-manufactured object by welding a filler metal and depositing weld beads, the machine learning device includes: at least one hardware processor configured to perform a learning process for generating a learned model using two pieces of shape data of a weld bead or a difference between the two pieces of shape data is used as input data and a difference
(Continued)

between welding conditions corresponding to the difference between the two pieces of shape data as output data.

4 Claims, 6 Drawing Sheets

(58) Field of Classification Search
CPC ...... B23K 9/04; B23K 9/0956; B23K 31/125; B23K 9/095; B33Y 50/02; B33Y 50/00; B33Y 30/00; Y02P 10/25; G06N 3/0464; G06N 3/09; G06N 20/00; G09B 19/24
See application file for complete search history.

(56) References Cited

U.S. PATENT DOCUMENTS

| | | | | |
|---|---|---|---|---|
| 2020/0030880 | A1* | 1/2020 | Nagahama | G06N 3/08 |
| 2020/0130264 | A1 | 4/2020 | Fukase et al. | |
| 2020/0357112 | A1* | 11/2020 | Sakai | G06T 7/0004 |
| 2021/0157312 | A1* | 5/2021 | Cella | G01M 13/045 |
| 2022/0161344 | A1* | 5/2022 | Zhang | B23K 31/125 |
| 2022/0410324 | A1* | 12/2022 | Hanada | B23K 9/02 |

OTHER PUBLICATIONS

The extended European search report issued by the European Patent Office on Dec. 8, 2023, which corresponds to European Patent Application No. 21842190.7.

Communication pursuant to Rule 114(2) EPC mailed by the European Patent Office on Aug. 8, 2023, which corresponds to European Patent Application No. 21842190.7-1103 and is related to U.S. Appl. No. 18/005,574.

U. Reisgen et al., "Study on Workpiece and Welding Torch Height Control for Polydirectional WAAM by Means of Image Processing", 2019 IEEE 15th International Conference on Automation Science and Engineering (CASE), Aug. 2019, Vancouver, Canada, pp. 6-11, https://ieeexplore.ieee.org/document/8843076, IEEE.

* cited by examiner

MACHINE LEARNING DEVICE, ADDITIVE MANUFACTURING SYSTEM, MACHINE LEARNING METHOD FOR WELDING CONDITION, METHOD FOR ADJUSTING WELDING CONDITION, AND A NON-TRANSITORY COMPUTER READABLE MEDIUM STORING A PROGRAM

TECHNICAL FIELD

The present invention relates to a machine learning device, an additive manufacturing system, a machine learning method for a welding condition, a method for adjusting a welding condition, and a program. More specifically, the present invention relates to a technique for adjusting a welding condition when an additively-manufactured object is manufactured by depositing weld beads.

BACKGROUND ART

In the related art, an additively-manufactured object is manufactured by depositing weld beads. When additive manufacturing is performed, it is necessary to perform control in consideration of various welding conditions in order to improve the manufacturing accuracy. Since there are many combinations of such welding conditions, the extraction of suitable welding conditions is very complicated and troublesome when performed manually.

In relation to the above situation, for example, Patent Literature 1 discloses a learning device for automatically determining an optimum welding condition in a welding device without teaching by a skilled operator. In this case, as information used for learning, bead appearance, a height and a width of a bead, a penetration amount, and the like are shown.

CITATION LIST

Patent Literature

Patent Literature 1: JP2017-30014A

SUMMARY OF INVENTION

Technical Problem

As described above, in the adjustment of the welding condition at the time of additive manufacturing, a very large number of condition combinations are conceivable to understand a change tendency of a bead shape (width, height, and the like), and it is difficult to specify an appropriate combination. For example, it is conceivable to create a database in which condition combinations are defined, but the creation of the database has a high load. Further, in creating the database, it is possible to ignore a machine difference between a power supply and a robot that perform additive manufacturing, and when the welding condition is adjusted based on such influence unique to the devices, the extraction of the welding condition becomes more complicated and troublesome. In Patent Literature 1 described above, such a machine difference between the power supply and the robot is not considered, and there is room for improvement in this respect as well.

In view of the above problems, an object of the present invention is to improve the accuracy of adjustment of a welding condition at the time of manufacturing an additively-manufactured object.

Solution to Problem

In order to solve the above problems, the present invention has the following configurations.
(1) A machine learning device that performs machine learning of a welding condition for manufacturing an additively-manufactured object by welding a filler metal and depositing weld beads, the machine learning device including:
at least one hardware processor configured to perform a learning process for generating a learned model using two pieces of shape data of a weld bead or a difference between the two pieces of shape data is used as input data and a difference between welding conditions corresponding to the difference between the two pieces of shape data as output data.

Further, the present invention according to another aspect has the following configurations.
(2) An additive manufacturing system for manufacturing an additively-manufactured object by welding a filler metal and depositing weld beads, the additive manufacturing system including:
at least one hardware processor configured to
create shape data of a weld bead as first shape data based on design data of the additively-manufactured object;
determine a welding condition for forming the first shape data;
acquire, as second shape data, shape data of a weld bead formed using the determined welding condition;
derive a difference between a welding condition corresponding to the first shape data and a welding condition corresponding to the second shape data by inputting the first shape data and the second shape data or a difference between the first shape data and the second shape data to a learned model, the learned model being generated by performing a learning process using two pieces of shape data of a weld bead or a difference between the two pieces of shape data as input data and a difference between welding conditions corresponding to the difference between the two pieces of shape data as output data; and
adjust the determined welding condition using the derived difference.

Further, the present invention according to another aspect has the following configurations.
(3) A machine learning method of a welding condition for manufacturing an additively-manufactured object by welding a filler metal and depositing weld beads, the machine learning method including:
a learning processing step of performing a learning process for generating a learned model using two pieces of shape data of a weld bead or a difference between the two pieces of shape data as input data and a difference between welding conditions corresponding to the difference between the two pieces of shape data as output data.

Further, the present invention according to another aspect has the following configurations.
(4) A method for adjusting a welding condition in an additive manufacturing system that manufactures an additively-manufactured object by welding a filler metal and depositing weld beads, the method including:
a creation step of creating shape data of a weld bead as first shape data based on design data of the additively-manufactured object;
a determination step of determining a welding condition for forming the first shape data;

an acquisition step of acquiring, as second shape data, shape data of a weld bead formed using the welding condition determined in the determination step;

a derivation step of deriving a difference between a welding condition corresponding to the first shape data and a welding condition corresponding to the second shape data by inputting the first shape data and the second shape data or a difference between the first shape data and the second shape data to a learned model, the learned model being generated by performing a learning process using two pieces of shape data of a weld bead or a difference between the two pieces of shape data as input data and a difference between welding conditions corresponding to the difference between the two pieces of shape data as output data; and an adjustment step of adjusting the welding condition determined in the determination step using the difference derived in the derivation step.

Further, the present invention according to another aspect has the following configurations.

(5) A program configured to cause a computer to execute a learning processing step of performing a learning process for generating a learned model using two pieces of shape data of a weld bead at the time of manufacturing an additively-manufactured object or a difference between the two pieces of shape data as input data and a difference between welding conditions corresponding to the difference between the two pieces of shape data as output data.

Further, the present invention according to another aspect has the following configurations.

(6) A program configured to cause a computer to execute:

a creation step of creating, as first shape data, shape data of a weld bead based on design data of an additively-manufactured object manufactured by welding a filler metal and depositing weld beads, a determination step of determining a welding condition for forming the first shape data, an acquisition step of acquiring, as second shape data, shape data of a weld bead formed using the welding condition determined in the determination step, a derivation step of deriving a difference between a welding condition corresponding to the first shape data and a welding condition corresponding to the second shape data by inputting the first shape data and the second shape data or a difference between the first shape data and the second shape data to a learned model, the learned model being generated by performing a learning process using two pieces of shape data of a weld bead or a difference between the two pieces of shape data as input data and a difference between welding conditions corresponding to the difference between the two pieces of shape data as output data, and an adjustment step of adjusting the welding condition determined in the determination step using the difference derived in the derivation step.

Advantageous Effects of Invention

According to the present invention, it is possible to improve the accuracy of adjustment of a welding condition at the time of manufacturing an additively-manufactured object.

DESCRIPTION OF EMBODIMENTS

Figure 1:
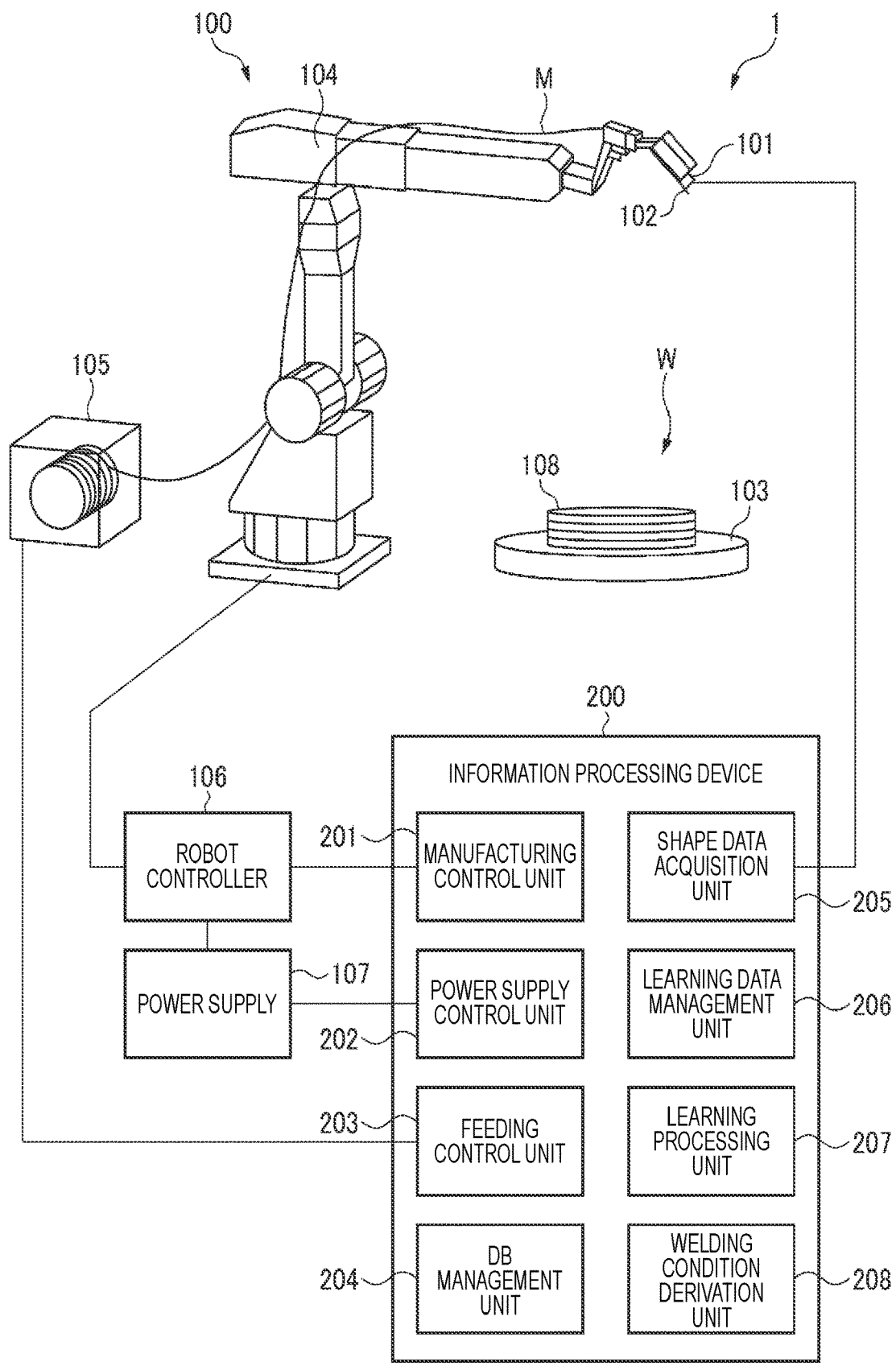
FIG. 1 is a schematic configuration diagram showing a configuration example of an additive manufacturing system according to an embodiment of the present invention.

Hereinafter, embodiments for carrying out the present invention will be described with reference to the drawings. The embodiments described below are embodiments for explaining the present invention and are not intended to be construed as limiting the present invention, and not all configurations described in the respective embodiments are essential configurations for solving the problems of the present invention. In the drawings, the same components are denoted by the same reference numerals to indicate the correspondence.

First Embodiment

Hereinafter, a first embodiment of the present invention will be described.

System Configuration

Hereinafter, an embodiment of the present invention will be described in detail with reference to the drawings. FIG. 1 is a schematic configuration diagram of an additive manufacturing system to which the present invention can be applied.

An additive manufacturing system 1 according to the present embodiment includes an additive manufacturing device 100 and an information processing device 200 that integrally controls the additive manufacturing device 100.

The additive manufacturing device 100 includes a welding robot 104, a filler metal feeding unit 105 for feeding a filler metal (welding wire) M to a torch 102, a robot controller 106 that controls the welding robot 104, and a power supply 107.

The welding robot 104 is an articulated robot, and the filler metal M is supported by the torch 102 provided on a distal shaft so as to be continuously fed. The torch 102 holds the filler metal M in a state in which the filler metal M protrudes from its tip. A position and a posture of the torch 102 can be freely set three-dimensionally within a range of degrees of freedom of a robot arm constituting the welding robot 104.

The torch 102 includes a shield nozzle (not shown), and a shield gas is supplied from the shield nozzle. The shield gas blocks the atmosphere and prevents oxidation, nitridation, and the like of a molten metal during welding to prevent lack of fusion. An arc welding method used in the present embodiment may be either a consumable electrode type such as shielded metal arc welding or carbon dioxide gas shielded arc welding, or a non-consumable electrode type such as TIG welding or plasma arc welding, and is appropriately selected according to an additively-manufactured object W to be manufactured.

In a vicinity of the torch 102, a shape sensor 101 capable of moving following the movement of the torch 102 is provided. The shape sensor 101 detects a shape of the additively-manufactured object W formed on a base 103. In the present embodiment, the shape sensor 101 can detect a height, a position, a width, and the like of a weld bead 108 (also simply referred to as a "bead") forming the additively-manufactured object W. Information detected by the shape sensor 101 is transmitted to the information processing device 200. A configuration of the shape sensor 101 is not particularly limited, and the shape sensor 101 may be configured to detect the shape by contact (contact sensor), or may be configured to detect the shape by a laser or the like (non-contact sensor). A device for deriving the shape of a formed bead is not limited to the shape sensor 101 disposed in the vicinity of the torch 102. For example, the shape of the formed bead may be indirectly derived. As an example, a profile of a welding current or a feeding speed of the filler metal M and a DB (database) indicating a tendency of a height of a bead may be defined in advance, and a height of a formed bead may be derived based on a welding condition at the time of manufacturing.

In the welding robot 104, when the arc welding method is a consumable electrode type, a contact tip is disposed inside the shield nozzle, and the filler metal M to which a molten current is supplied is held by the contact tip. The torch 102 generates an arc from the tip of the filler metal M in a shield gas atmosphere while holding the filler metal M. The filler metal M is fed from the filler metal feeding unit 105 to the torch 102 by a feeding mechanism (not shown) attached to the robot arm or the like. When the continuously fed filler metal M is melted and solidified while moving the torch 102, the linear weld bead 108, which is a melted and solidified body of the filler metal M, is formed on the base 103. By depositing the weld beads 108, the additively-manufactured object W is manufactured.

A heat source for melting the filler metal M is not limited to the arc described above. For example, a heat source using another method such as a heating method using an arc and a laser in combination, a heating method using plasma, or a heating method using an electron beam or a laser may be used. In the case of heating with an electron beam or a laser, a heating amount can be more finely controlled to keep the weld bead 108 in a more proper state, thereby contributing to further improvement of the quality of the additively-manufactured object W.

The robot controller 106 drives the welding robot 104 by a predetermined drive program based on an instruction from the information processing device 200, and manufactures the additively-manufactured object W on the base 103. That is, the welding robot 104 moves the torch 102 while melting the filler metal M with an arc according to a command from the robot controller 106. The power supply 107 is a welding power supply that supplies power required for welding to the robot controller 106. The power supply 107 can operate in a plurality of control modes, and can switch the power (current, voltage, or the like) when supplying power to the robot controller 106 according to the control mode. The filler metal feeding unit 105 controls the feeding and the feeding speed of the filler metal M to the torch 102 of the welding robot 104 based on an instruction from the information processing device 200.

The information processing device 200 may be, for example, an information processing device such as a personal computer (PC). Functions shown in FIG. 1 may be implemented by a control unit (not shown) reading and executing a program of a function according to the present embodiment stored in a storage unit (not shown). The storage unit may include a random access memory (RAM) that is a volatile storage area, a read only memory (ROM) that is a non-volatile storage area, a hard disk drive (HDD), and the like. As the control unit, a central processing unit (CPU), a graphical processing unit (GPU), a general-purpose computing on graphics processing units (GPGPU), or the like may be used.

The information processing device 200 includes a manufacturing control unit 201, a power supply control unit 202, a feeding control unit 203, a DB management unit 204, a shape data acquisition unit 205, a learning data management unit 206, a learning processing unit 207, and a welding condition derivation unit 208. The manufacturing control unit 201 generates, based on design data (for example, CAD/CAM data) of the additively-manufactured object W to be manufactured, a control signal for the robot controller 106 at the time of manufacturing. Here, the control signal includes a movement trajectory of the torch 102 by the welding robot 104, a welding condition at the time of forming the weld bead 108, the feeding speed of the filler metal M by the filler metal feeding unit 105, and the like. The movement trajectory of the torch 102 is not limited to a trajectory of the torch 102 during the formation of the weld bead 108 on the base 103, and includes, for example, a movement trajectory of the torch 102 to a start position at which the weld bead 108 is formed.

The power supply control unit 202 controls the power supply (control mode) to the robot controller 106 by the power supply 107. Values of a current and a voltage, a waveform (pulse) of the current, and the like when forming beads having the same shape may also differ depending on the control mode. In addition, the power supply control unit 202 acquires, from the power supply 107, information on a current or a voltage provided to the robot controller 106 at an appropriate time.

The feeding control unit 203 controls the feeding speed and feeding timing of the filler metal M by the filler metal feeding unit 105. Here, the feeding control of the filler metal M includes not only the feeding (forward feeding) but also the returning (backward feeding). The DB management unit 204 manages a DB (database) according to the present embodiment. Details of the DB according to the present embodiment will be described later. The shape data acquisition unit 205 acquires shape data of the weld bead 108 formed on the base 103 detected by the shape sensor 101.

The learning data management unit 206 generates and manages learning data used in a learning process performed by the learning processing unit 207. The learning processing unit 207 performs the learning process using the learning data managed by the learning data management unit 206. Details of the learning data and the learning process according to the present embodiment will be described later. The learning processing unit 207 manages a learned model obtained as a result of the learning process. As described above, the power supply 107 according to the present embodiment can operate in a plurality of control modes. Accordingly, the learning processing unit 207 according to the present embodiment performs learning corresponding to the respective plurality of control modes of the power supply 107 and generates learned models.

The welding condition derivation unit 208 derives an adjustment amount for a welding condition of the manufacturing control unit 201 using a learned model generated by the learning processing unit 207, and notifies the manufacturing control unit 201 of the adjustment amount. A method of deriving the adjustment amount according to the present embodiment will be described later.

In the present embodiment, as shown in FIG. 1, a configuration in which the weld bead 108 is formed by moving the torch 102 on the cylindrical base 103 to manufacture the additively-manufactured object W will be described as an example. In FIG. 1, the base 103 of the present embodiment has a configuration in which the additively-manufactured object W is manufactured on a plane of a cylinder, and the base 103 is not limited thereto. For example, the base 103 may have a cylindrical shape, and the weld bead 108 may be formed on an outer periphery of a side surface of the base 103. In addition, a coordinate system in the design data according to the present embodiment is associated with a coordinate system on the base 103 on which the additively-manufactured object W is manufactured, and three axes (X axis, Y axis, and Z axis) of the coordinate system are set such that a three-dimensional position is defined with any position as an origin.

The additive manufacturing system 1 configured as described above melts the filler metal M and feeds the melted filler metal M onto the base 103 while moving the torch 102 according to the movement trajectory of the torch 102 defined based on the set design data by driving the welding robot 104. As a result, the additively-manufactured object W in which a plurality of linear weld beads 108 are arranged and deposited on an upper surface of the base 103 is manufactured.

Relations of Factors During Manufacturing

When the additively-manufactured object W is manufactured, it is necessary to adjust a control parameter at the time of manufacturing due to an operation state of the power supply 107, characteristics specific to a device, a configuration of the additively-manufactured object W, and the like. More specifically, a bead shape may change according to various control parameters at the time of welding. Examples of the control parameters that affect the bead shape will be described below.

Figure 2A:
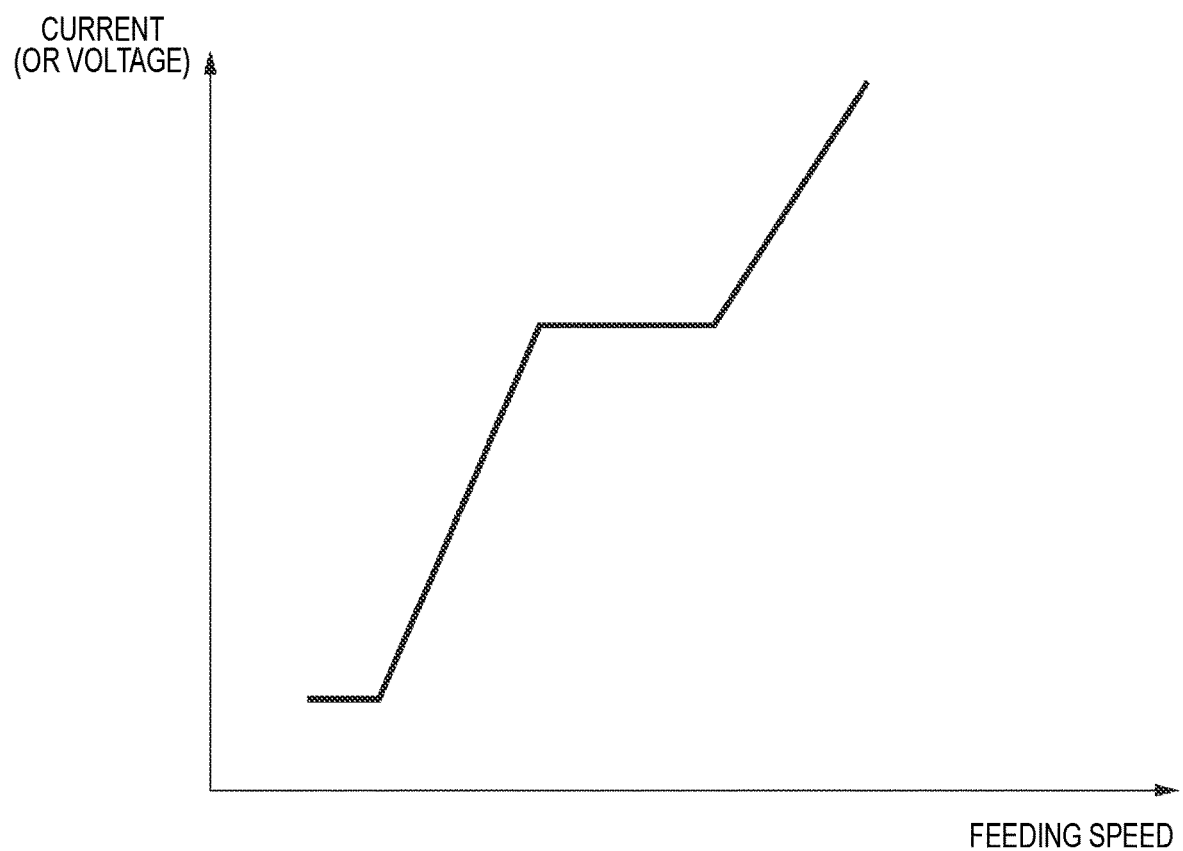
FIG. 2A is a conceptual diagram for illustrating a relation between a feeding speed and a control value of a power supply.

Examples of the control parameters that affect the bead shape include the feeding speed of the filler metal M, a travel speed, a welding amount, a target position, an amplitude and a frequency of weaving, and an amount of heat input. The feeding speed of the filler metal M will be described as an example. FIG. 2A is a diagram showing a relation between the feeding speed of the filler metal M and a current (or voltage) supplied from the power supply 107, in which a horizontal axis represents the feeding speed of the filler metal M and a vertical axis represents a control value of the current (or voltage) supplied from the power supply 107. As the feeding speed increases, the current (or voltage) supplied from the power supply 107 increases, but the increase is not constant. A tendency of this variation may vary depending on the control mode of the power supply 107. Therefore, due to a difference in the tendency of the variation, a shape of a formed bead may vary even with the same control parameter.

Figure 2B:
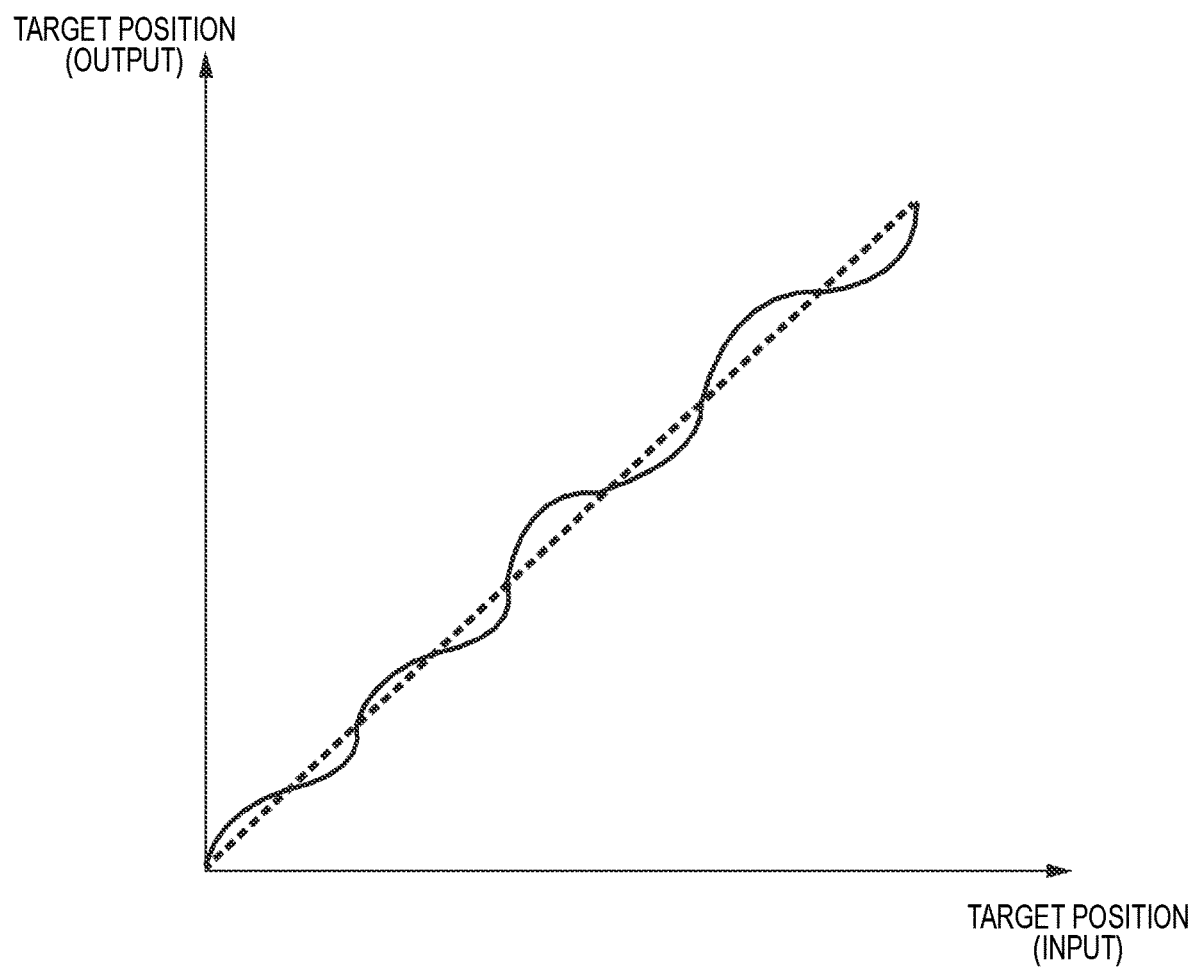
FIG. 2B is a conceptual diagram for illustrating a relation between target position input and output at the time of bead formation in the additive manufacturing system.

As another example, the target position at the time of bead formation will be described. FIG. 2B is a diagram showing a relation between a target position (input) of a bead on the base 103 specified based on design data and a target position (output) of a bead obtained as a formation result, in which a horizontal axis represents the input and a vertical axis represents the output. In FIG. 2B, a broken line indicates an ideal relation between the input and the output, and an input value (that is, a design value) and an output value indicate the same value. However, in practice, the input value and the output value do not necessarily coincide with each other due to various factors such as device performance and specifications. For example, a solid line in FIG. 2B shows an example of a relation between an actual input value and an actual output value, and as shown in the solid line, a difference may occur between the design value and an output result. Therefore, even with same control parameters, the bead shape may vary due to a difference (deviation) in the target position.

Figure 3:
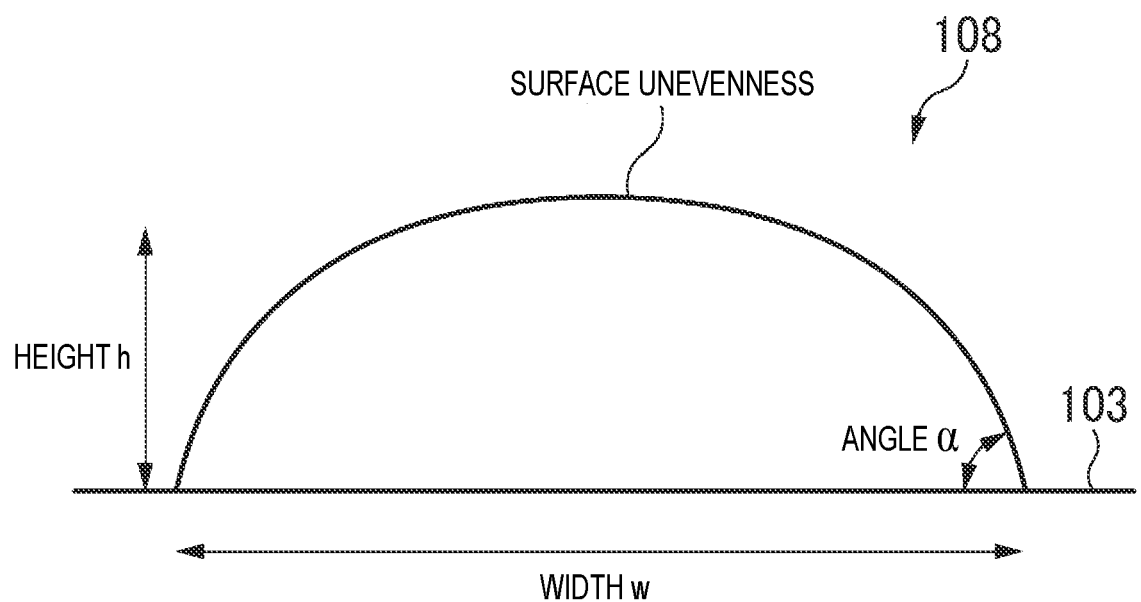
FIG. 3 is a conceptual diagram for illustrating bead shape data.

FIG. 3 is a conceptual diagram for illustrating shape data of a weld bead. FIG. 3 shows a cross section of the weld bead 108 formed on the base 103 as seen from a travel direction of the torch 102 during formation. As shown in FIG. 3, as the shape data of the weld bead 108, information such as a height h, a width w, an angle $\alpha$ of a root part, and surface unevenness can be used.

Database

In the present embodiment, a database indicating a relation between a welding condition and shape information of a bead formed under the welding condition is used. The database is managed by the DB management unit 204 and is defined in advance. As described above, the power supply 107 according to the present embodiment can operate in a plurality of control modes. Accordingly, a plurality of databases corresponding to the respective control modes are defined and managed.

In the database according to the present embodiment, a predetermined control parameter as a welding condition and information on a shape of a bead formed when welding is performed using the control parameter are stored in association with each other. Items of the welding condition include the welding amount of the filler metal M, the target position, the weaving conditions, the amount of heat input, the number of deposition passes, the temperature of a base material, an inter-pass time, and the like as described above. Items of the bead shape information include the height, the width, the angle of the root part, the surface unevenness of a bead as shown in FIG. 3. The items of various types of information defined in the database are not limited to those described above, and may be increased or decreased as necessary.

Learning Process

In the present embodiment, a method of deep learning using a neural network among machine learning methods is used as a learning method, and supervised learning will be described as an example. A more specific method (algorithm) of deep learning is not particularly limited, and for example, a known method such as a convolutional neural network (CNN) may be used. In addition, a type and the number of layers constituting the neural network are also not particularly limited.

Figure 4:
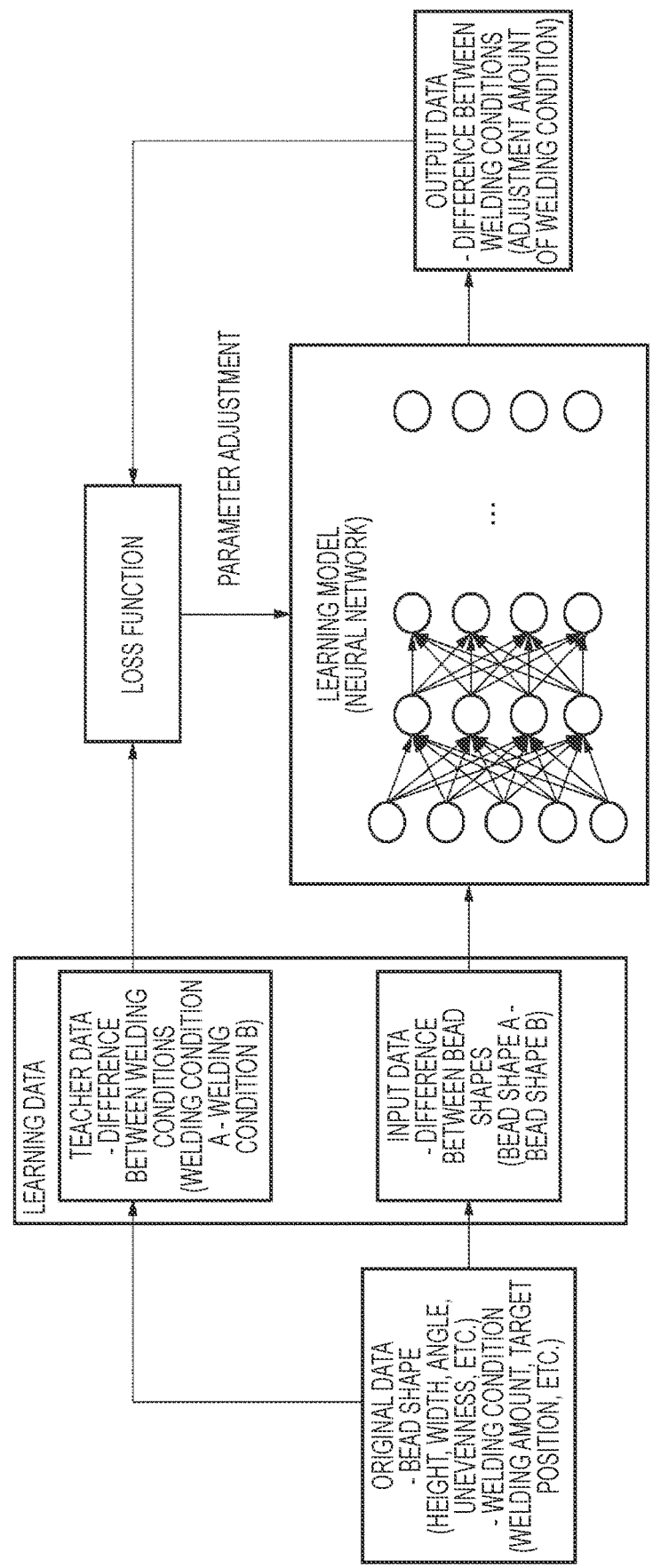
FIG. 4 is a schematic diagram for illustrating a concept of a learning process according to an embodiment of the present invention.

FIG. 4 is a schematic diagram for illustrating a concept of the learning process according to the present embodiment. First, in the present embodiment, as original data, a plurality of pairs of shape data indicating a shape of a bead and welding conditions used when the bead is formed are used. As the original data, data stored as a bead formation history may be used. The plurality of pairs of data are used to obtain respective differences between the shape data and the welding conditions. For example, a difference between shape data A of a bead shape A and shape data B of a bead shape B, and a difference between a welding condition A corresponding to the bead shape A and a welding condition B corresponding to the bead shape B are obtained. Then, in these differences, a plurality pieces of learning data in which a difference in the bead shape is used as input data and a difference in the welding condition is used as teacher data are prepared. In the present embodiment, a difference in the bead shape is described as an example of the input data included in the learning data, and the present invention is not limited thereto, and a pair of two shape data for deriving the difference may be used as the input data.

In the present embodiment, the learning process is performed using the learning data described above. When input data (here, a difference in the bead shape) prepared as the learning data is input to a learning model, a difference in the welding condition is output as output data with respect to the input data. The output data corresponds to the adjustment amount of the welding condition. Next, an error is derived by a loss function using the output data and the teacher data (here, a difference in the welding condition) prepared as the learning data. Then, parameters in the learning model are adjusted so as to reduce the error. For the adjustment of the parameters, for example, an error back propagation method or the like be used. In this way, the learned model is generated by repeatedly performing learning using a plurality of pieces of learning data. Since the learned model is updated each time the learning process is performed, parameters constituting the learned model are changed according to the timing of use, and an output result with respect to the input data is also different. When a pair of two pieces of shape data is used as the input data, basically, the same operation is performed.

The information processing device 200 does not necessarily need to perform the learning process. For example, the information processing device 200 may be configured to provide the learning data to a learning server (not shown) provided outside the information processing device 200 and perform the learning process on the server side. If necessary, the server may provide the learned model to the information processing device 200. Such a learning server may be located on a network (not shown) such as the Internet, for example, and the learning server and the information processing device 200 are communicably connected to each other. That is, the information processing device 200 may operate as a machine learning device, or an external device may operate as a machine learning device. In any case, the information processing device 200 acquires the learned model obtained by the learning process and can be used when the additively-manufactured object W is manufactured.

Process Flow

Figure 5:
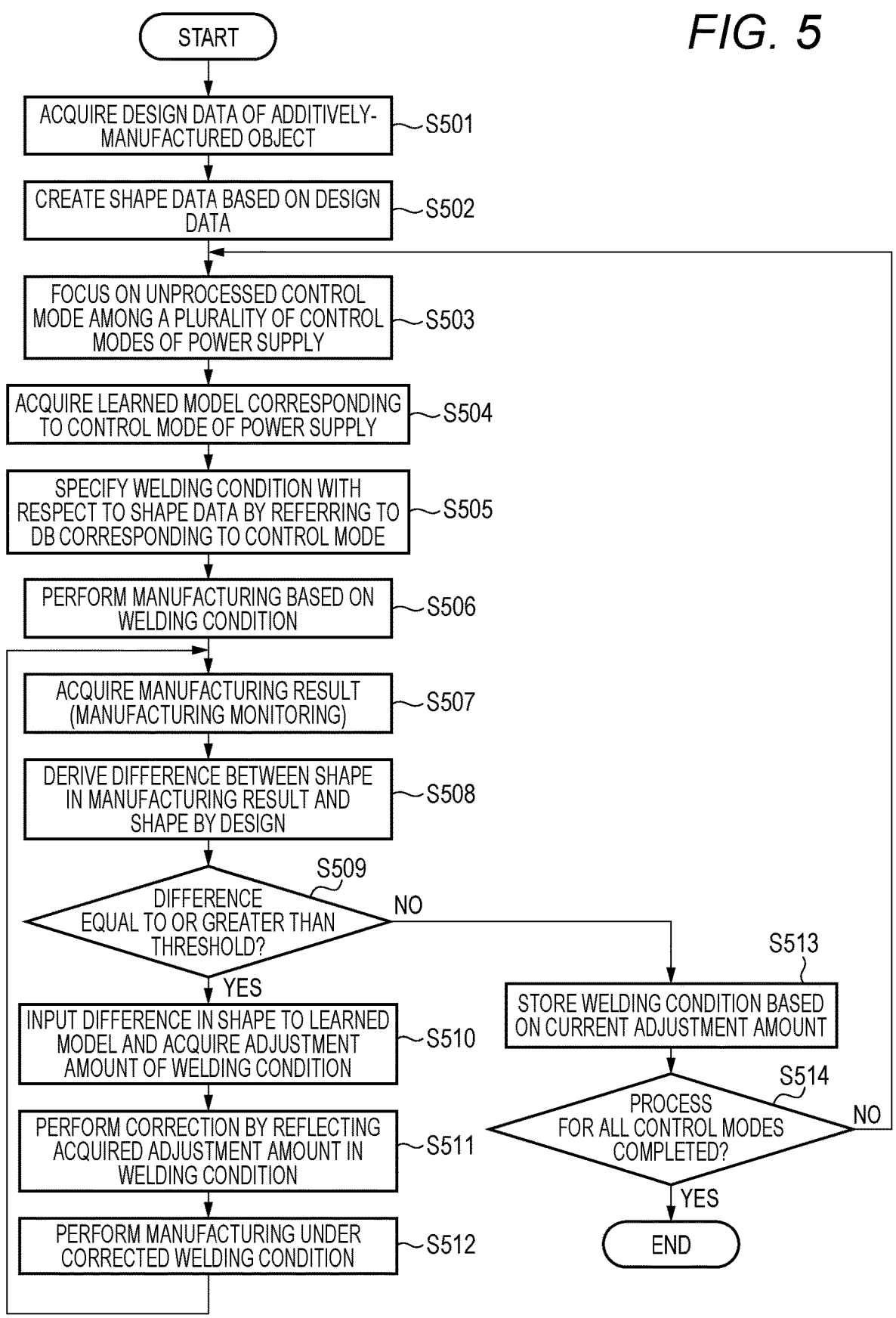
FIG. 5 is a flowchart of a manufacturing process according to a first embodiment of the present invention.

FIG. 5 is a flowchart of an adjustment process of the welding condition according to the present embodiment. This process is performed and controlled by the information processing device 200, and may be implemented, for example, by a processing unit such as a CPU or a GPU included in the information processing device 200 reading out a program for implementing the units shown in FIG. 1 from a storage unit (not shown) and executing the program. The learning process described above is performed and a learned model is generated before the process flow is started.

A process for adjusting parameters according to the present process flow may be performed immediately before the actual manufacture of the additively-manufactured object W is started. Alternatively, the process may be performed when a control mode of a power supply is switched or when a layer of a bead to be formed is transferred to a next layer while the additively-manufactured object W is being manufactured. Here, a case will be described in which the adjustment is performed using a position different from a position at which the additively-manufactured object W is manufactured on the base 103 immediately before the additively-manufactured object W is manufactured.

In S501, the information processing device 200 acquires design data of the additively-manufactured object W. Here, the design data is data specifying a shape and the like of the additively-manufactured object W, and is created based on an instruction of a user. For example, the design data may be input from an external device (not shown) communicably connected to the information processing device 200, or may be created on the information processing device 200 via a predetermined application (not shown).

In S502, the information processing device 200 causes the additive manufacturing device 100 to create, based on the design data acquired in S501, pass data corresponding to beads forming the additively-manufactured object W. Here, the pass data may include information such as a movement trajectory of the torch 102 in addition to shape data indicating a bead shape. The shape data created here corresponds to a design value, and may be stored and managed in a storage unit (not shown).

In S503, the information processing device 200 focuses on one control mode in which a parameter adjustment process is not performed among a plurality of control modes in which the power supply 107 can operate. Here, the control mode to be processed may be any control mode in which the power supply 107 can operate, or may be limited to one or more control modes used when the additively-manufactured object W is manufactured using the design data acquired in S501.

In S504, the information processing device 200 acquires a learned model corresponding to the control mode focused in S503. As described above, different learned models are generated according to the control mode, and a corresponding learned model is acquired from among the learned models.

In S505, the information processing device 200 specifies a welding condition corresponding to the shape data created in S502 by referring to a DB corresponding to the control mode focused in S503. As described above, the welding condition is associated with the bead shape data in the DB, and the welding condition can be specified by specifying the shape data.

In S506, the information processing device 200 causes the welding robot 104 to perform a manufacturing operation based on the welding condition specified in S505. Here, the manufacturing operation is not performed to manufacture a part of the additively-manufactured object W, but is performed to form a bead for parameter adjustment at a different position.

In S507, the information processing device 200 acquires shape data as a bead formation result performed in S506 via the shape sensor 101. As described above, the shape sensor 101 according to the present embodiment is provided so as to move following the torch 102. The shape data may be acquired along with bead formation, or may be acquired after bead formation is completed. As shown in FIG. 3, examples of the shape data acquired here include a height, a width, an angle of a root part, and surface unevenness of a formed bead.

In S508, the information processing device 200 derives a difference between the shape data (measurement value) acquired in S507 and the shape data (design value) created in S502. For example, when the shape data includes a plurality of items such as a height and a width, respective differences are derived.

In S509, the information processing device 200 compares the difference derived in S508 with a predetermined threshold, and determines whether the difference is equal to or greater than the threshold. The threshold is set for each shape data item and is stored in a storage unit (not shown). The threshold used here may vary depending on the control mode, or a fixed value may be used. If the difference is equal to or greater than the threshold (YES in S509), the process of the information processing device 200 proceeds to S510. On the other hand, if the difference is smaller than the threshold (NO in S509), the process of the information processing device 200 proceeds to S513. In addition, when a plurality of items in the shape data are used for the determination, YES may be determined when all the items are equal to or greater than the threshold as a result of comparison between the items and the threshold. In this case, the threshold is set for each of the items.

In S510, the information processing device 200 inputs the difference derived in S508 to the learned model acquired in S503 as input data, thereby acquiring a difference in a welding condition as output data. The difference corresponds to an adjustment amount with respect to a welding condition used for the formation of an immediately preceding bead. As described above, when learning is performed using a pair of shape data as input data, a pair of the shape data (measurement value) acquired in S507 and the shape data (design value) created in S502 is input instead of the difference derived in S508.

In S511, the information processing device 200 corrects a welding condition used for forming an immediately preceding bead by reflecting the adjustment amount acquired in S510.

In S512, the information processing device 200 performs bead formation again under the welding condition corrected in S511. Thereafter, the process returns to S507, and subsequent processes are repeated. That is, the processes of S507 to S512 are repeated until a difference between the design value based on the design data and the measurement result based on an actual formation result is less than the threshold. Therefore, the adjustment amount acquired in S510 is repeatedly accumulated and reflected in the welding condition, so that the difference gradually decreases (converges).

In S513, the information processing device 200 stores a welding condition based on the current adjustment amount in a storage unit (not shown) in association with the control mode of the power supply 107 of interest. The welding condition (or the adjustment amount) stored here is used when the additively-manufactured object W is manufactured. Thereafter, the process proceeds to S514.

In S514, the information processing device 200 determines whether the parameter adjustment process is completed for all the control modes in which the power supply 107 can operate. If there is an unprocessed control mode (NO in S514), the process of the information processing device 200 returns to S503, and the subsequent processes are repeated. On the other hand, if the process for all the control modes is completed (YES in S514), the process flow ends.

In the flowchart described above, an example in which the parameter adjustment is performed based on the design data of the additively-manufactured object W has been described. At this time, the parameter adjustment corresponding to a layer or a positional relation may be performed based on the number of layers of beads indicated by the design data or a positional relation with an adjacent bead. More specifically, information on the number of layers and positions may be further used as the shape data. By including such information, it is possible to perform the parameter adjustment in consideration of sagging of a bead due to a formation position of the bead, fusion with an adjacent bead, and the like. Instead of using the design data of the additively-manufactured object W, the parameter adjustment is performed based on shape data for parameter adjustment defined in advance.

As described above, according to the present embodiment, it is possible to improve the accuracy of adjustment of a welding condition at the time of manufacturing an additively-manufactured object. In particular, by deriving a relation between a change tendency of a welding condition and a change tendency of a bead shape using a learned model, it is possible to adjust the welding condition independent of a system. In addition, it is not necessary to create a database in consideration of a machine difference of a system, and the present invention can be applied to various additive manufacturing systems using only a general-purpose database.

Other Embodiments

In addition to the configuration described in the first embodiment, the additive manufacturing system 1 may generate a learning data used in a learning process. For example, at the time of manufacturing the additively-manufactured object W, a bead shape is detected by the shape sensor 101 each time a bead is formed, and a welding condition, shape data, and a control mode of a power supply when the bead is formed are stored in association with each other. Further, the learning data may be generated by obtaining differences as described with reference to FIG. 4 using the stored data. At this time, data for generating the learning data may be specified by a user of the additive manufacturing system 1, or may be extracted by filtering accumulated data under any condition.

In the present invention, a program or an application for implementing the functions of one or more embodiments described above may be supplied to a system or a device using a network, a storage medium, or the like, and one or more processors in a computer of the system or the device may read and execute the program.

The functions may be implemented by a circuit (for example, an application specific integrated circuit (ASIC) or a field programmable gate array (FPGA)) that implements one or more functions.

As described above, the present specification discloses the following matters.

(1) A machine learning device that performs machine learning of a welding condition for manufacturing an additively-manufactured object by welding a filler metal and depositing weld beads, the machine learning device including:
at least one hardware processor configured to perform a learning process for generating a learned model using two pieces of shape data of a weld bead or a difference between the two pieces of shape data is used as input data and a difference between welding conditions corresponding to the difference between the two pieces of shape data as output data.

According to this configuration, it is possible to improve the accuracy of adjustment of a welding condition at the time of manufacturing an additively-manufactured object. In particular, it is possible to generate a learned model for deriving an adjustment amount of a welding condition, which is used when adjusting the welding condition and which corresponds to a change tendency of shape data.

(2) The machine learning device according to (1), wherein the shape data includes at least one of a height, a width, an angle of a root part, and surface unevenness of a weld bead.

According to this configuration, a welding condition can be adjusted in consideration of a height, a width, an angle, and a surface shape of a bead as shape data.

(3) The machine learning device according to (1), wherein the welding condition includes at least one of a feeding speed of the filler metal, a travel speed, a current or a voltage of welding, a target position on a base on which the additively-manufactured object is manufactured, an amount of heat input at a time of manufacturing, and a weaving control condition.

According to this configuration, it is possible to adjust a feeding speed of a filler metal, a target position on a base, an amount of heat input at the time of manufacturing, and a weaving control condition as welding conditions.

(4) The machine learning device according to (3), wherein the welding condition further includes the number of deposition passes or the temperature of a base material.

According to this configuration, it is possible to further adjust the number of deposition passes and the temperature of a base material as welding conditions. For example, it is possible to perform a learning process in consideration of load accumulation such as friction of an electrode or adhesion of sputtering to a nozzle due to an increase in the number of deposition passes. In addition, it is possible to perform a learning process in consideration of heat accumulation in a base.

(5) The machine learning device according to (1), wherein the at least one hardware processor generates a learned model for each control mode of a power supply used when the additively-manufactured object is manufactured.

According to this configuration, it is possible to generate a learned model according to a control mode of a power supply and to more accurately adjust a welding condition.

(6) The machine learning device according to (5), wherein at least one of a voltage value, a current value, and a current pulse supplied corresponding to the welding condition is different for each control mode of the power supply.

According to this configuration, it is possible to generate a learned model in which different voltage values, different current values, and different pulses are taken into consideration in a control mode of a power supply.

(7) The machine learning device according to (1), wherein the at least one hardware processor performs the learning process using a supervised learning method using a neural network.

According to this configuration, it is possible to perform machine learning corresponding to supervised learning using a neural network.

(8) An additive manufacturing system for manufacturing an additively-manufactured object by welding a filler metal and depositing weld beads, the additive manufacturing system including:
at least one hardware processor configured to
create shape data of a weld bead as first shape data based on design data of the additively-manufactured object;
determine a welding condition for forming the first shape data;
acquire, as second shape data, shape data of a weld bead formed using the determined welding condition;
derive a difference between a welding condition corresponding to the first shape data and a welding condition corresponding to the second shape data by inputting the first shape data and the second shape data or a difference between the first shape data and the second shape data to a learned model, the learned model being generated by performing a learning process using two pieces of shape data of a weld bead or a difference between the two pieces of shape data as input data and a difference between welding conditions corresponding to the difference between the two pieces of shape data as output data; and
adjust the determined welding condition using the derived difference.

According to this configuration, it is possible to improve the accuracy of adjustment of a welding condition at the time of manufacturing an additively-manufactured object. By deriving a relation between a change tendency of a welding condition and a change tendency of a bead shape using a learned model, it is possible to adjust the welding condition independent of a system. In addition, it is not necessary to create a separate database in consideration of a machine difference of a system, and the present invention can be applied to various additive manufacturing systems using only a general-purpose database.

(9) The additive manufacturing system according to (8), wherein
the at least one hardware processor derives a difference for adjusting the determined welding condition when the difference between the first shape data and the second shape data is equal to or greater than a predetermined threshold.

According to this configuration, by repeatedly performing the adjustment of a welding condition, it is possible to perform control so as to obtain predetermined accuracy.

(10) The additive manufacturing system according to (8), wherein
the at least one hardware processor determines the welding condition for forming the first shape data using a database in which a shape of a weld bead is associated with a welding condition in advance.

According to this configuration, it is possible to determine a welding condition as a reference by using a general-purpose database, and perform adjustment based on the reference. Therefore, it is possible to reduce the labor of creating a database of welding conditions for each device.

(11) The additive manufacturing system according to (8), wherein
the at least one hardware processor acquires the shape data of the weld bead by measuring the weld bead using a sensor.

According to this configuration, it is possible to acquire an actual measurement value of a bead shape by a sensor and use the measurement value for comparison with a design value.

(12) A machine learning method of a welding condition for manufacturing an additively-manufactured object by welding a filler metal and depositing weld beads, the machine learning method including:

a learning processing step of performing a learning process for generating a learned model using two pieces of shape data of a weld bead or a difference between the two pieces of shape data as input data and a difference between welding conditions corresponding to the difference between the two pieces of shape data as output data.

According to this configuration, it is possible to improve the accuracy of adjustment of a welding condition at the time of manufacturing an additively-manufactured object. In particular, it is possible to generate a learned model for deriving an adjustment amount of a welding condition, which is used when adjusting the welding condition and which corresponds to a change tendency of shape data.

(13) A method for adjusting a welding condition in an additive manufacturing system that manufactures an additively-manufactured object by welding a filler metal and depositing weld beads, the method including:

a creation step of creating shape data of a weld bead as first shape data based on design data of the additively-manufactured object;

a determination step of determining a welding condition for forming the first shape data;

an acquisition step of acquiring, as second shape data, shape data of a weld bead formed using the welding condition determined in the determination step;

a derivation step of deriving a difference between a welding condition corresponding to the first shape data and a welding condition corresponding to the second shape data by inputting the first shape data and the second shape data or a difference between the first shape data and the second shape data to a learned model, the learned model being generated by performing a learning process using two pieces of shape data of a weld bead or a difference between the two pieces of shape data as input data and a difference between welding conditions corresponding to the difference between the two pieces of shape data as output data; and an adjustment step of adjusting the welding condition determined in the determination step using the difference derived in the derivation step.

According to this configuration, it is possible to improve the accuracy of adjustment of a welding condition at the time of manufacturing an additively-manufactured object. By deriving a relation between a change tendency of a welding condition and a change tendency of a bead shape using a learned model, it is possible to adjust the welding condition independent of a system. In addition, it is not necessary to create a separate database in consideration of a machine difference of a system, and the present invention can be applied to various additive manufacturing systems using only a general-purpose database.

(14) A program configured to cause a computer to execute a learning processing step of performing a learning process for generating a learned model using two pieces of shape data of a weld bead at the time of manufacturing an additively-manufactured object or a difference between the two pieces of shape data as input data and a difference between welding conditions corresponding to the difference between the two pieces of shape data as output data.

According to this configuration, it is possible to improve the accuracy of adjustment of a welding condition at the time of manufacturing an additively-manufactured object. In particular, it is possible to generate a learned model for deriving an adjustment amount of a welding condition, which is used when adjusting the welding condition and which corresponds to a change tendency of shape data.

(15) A program configured to cause a computer to execute:

a creation step of creating, as first shape data, shape data of a weld bead based on design data of an additively-manufactured object manufactured by welding a filler metal and depositing weld beads, a determination step of determining a welding condition for forming the first shape data, an acquisition step of acquiring, as second shape data, shape data of a weld bead formed using the welding condition determined in the determination step, a derivation step of deriving a difference between a welding condition corresponding to the first shape data and a welding condition corresponding to the second shape data by inputting the first shape data and the second shape data or a difference between the first shape data and the second shape data to a learned model, the learned model being generated by performing a learning process using two pieces of shape data of a weld bead or a difference between the two pieces of shape data as input data and a difference between welding conditions corresponding to the difference between the two pieces of shape data as output data, and an adjustment step of adjusting the welding condition determined in the determination step using the difference derived in the derivation step.

According to this configuration, it is possible to improve the accuracy of adjustment of a welding condition at the time of manufacturing an additively-manufactured object. By deriving a relation between a change tendency of a welding condition and a change tendency of a bead shape using a learned model, it is possible to adjust the welding condition independent of a system. In addition, it is not necessary to create a separate database in consideration of a machine difference of a system, and the present invention can be applied to various additive manufacturing systems using only a general-purpose database.

Although various embodiments have been described above with reference to the drawings, it is needless to say that the present invention is not limited to such examples. It is apparent to those skilled in the art that various changes and modifications can be conceived within the scope of the claims, and it is also understood that such changes and modifications belong to the technical scope of the present invention. In addition, constituent elements in the embodiments described above may be combined freely within a range not departing from the spirit of the present invention.

The present application is based on a Japanese patent application (Japanese patent application No. 2020-121581)

filed on Jul. 15, 2020, contents of which are incorporated by reference in the present application.

REFERENCE SIGNS LIST 1 additive manufacturing system
100 additive manufacturing device
101 shape sensor
102 torch
103 base
104 welding robot
106 robot controller
107 power supply
108 weld bead
200 information processing device
201 manufacturing control unit
202 power supply control unit
203 feeding control unit
204 DB (database) management unit
205 shape data acquisition unit
206 learning data management unit
207 learning processing unit
208 welding condition derivation unit
W additively-manufactured object
M filler metal

The invention claimed is:

1. An additive manufacturing system for manufacturing an additively-manufactured object by welding a filler metal and depositing weld beads, the additive manufacturing system comprising:
at least one hardware processor configured to
create first shape data of a first weld bead based on design data of the additively-manufactured object;
determine a welding condition for forming the first weld bead;
acquire second shape data of a second weld bead formed using the determined welding condition;
derive a difference between a welding condition corresponding to the first shape data and a welding condition corresponding to the second shape data by inputting the first shape data and the second shape data or a difference between the first shape data and the second shape data to a learned model, the learned model being generated by performing a learning process using input data including two pieces of shape data of a weld bead or a difference between the two pieces of shape data and output data including a difference between welding conditions corresponding to the difference between the two pieces of shape data; and
adjust the determined welding condition using the derived difference.

2. The additive manufacturing system according to claim 1, wherein the at least one hardware processor derives a difference for adjusting the determined welding condition when the difference between the first shape data and the second shape data is equal to or greater than a predetermined threshold.

3. The additive manufacturing system according to claim 1, wherein the at least one hardware processor determines the welding condition for forming the first shape data using a database in which a shape of the first weld bead is associated with a welding condition in advance.

4. The additive manufacturing system according to claim 1, wherein the at least one hardware processor acquires the second shape data of the second weld bead by measuring the second weld bead using a sensor.

* * * * *